United States Patent
Hosokawa et al.

(10) Patent No.: US 9,529,120 B2
(45) Date of Patent: Dec. 27, 2016

(54) LIGHT-SHIELDING COATING, LIGHT-SHIELDING FILM, AND OPTICAL ELEMENT

(75) Inventors: Katsumoto Hosokawa, Tokyo (JP); Shuhei Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 14/238,176

(22) PCT Filed: Jul. 30, 2012

(86) PCT No.: PCT/JP2012/004833
§ 371 (c)(1),
(2), (4) Date: Feb. 10, 2014

(87) PCT Pub. No.: WO2013/021575
PCT Pub. Date: Feb. 14, 2013

(65) Prior Publication Data
US 2015/0301229 A1 Oct. 22, 2015

(30) Foreign Application Priority Data
Aug. 11, 2011 (JP) .................................. 2011-175898

(51) Int. Cl.
*G02B 1/10* (2015.01)
*C09D 5/00* (2006.01)
*C09D 5/32* (2006.01)
*C09D 7/12* (2006.01)
*C09D 163/00* (2006.01)
*G02B 5/22* (2006.01)
*G02B 27/00* (2006.01)
*G02B 1/04* (2006.01)

(52) U.S. Cl.
CPC ................. *G02B 1/10* (2013.01); *C09D 5/006* (2013.01); *C09D 5/32* (2013.01); *C09D 7/1266* (2013.01); *C09D 163/00* (2013.01); *G02B 1/04* (2013.01); *G02B 5/223* (2013.01); *G02B 27/0018* (2013.01)

(58) Field of Classification Search
CPC ........... G02B 1/10; G02B 1/04; C09D 7/1266; C09D 163/00
USPC ......... 359/737–738, 601–614; 523/440, 442; 524/497
See application file for complete search history.

(56) References Cited

U.S. PATENT DOCUMENTS

2011/0170196 A1 7/2011 Tanaka

FOREIGN PATENT DOCUMENTS

| EP | 1886972 A1 | 2/2008 |
|---|---|---|
| EP | 2298694 A1 | 3/2011 |
| EP | 2314649 A1 | 4/2011 |
| JP | 4732419 A | 11/1972 |
| JP | 782510 A | 3/1995 |
| JP | 2006312716 A | 11/2006 |
| JP | 2010235756 A | 10/2010 |
| JP | 2011141493 A | 7/2011 |
| WO | 2010104146 A1 | 9/2010 |

*Primary Examiner* — Scott J Sugarman
*Assistant Examiner* — Kristina Deherrera
(74) *Attorney, Agent, or Firm* — Canon U.S.A., Inc. IP Division

(57) ABSTRACT

The present invention relates to a light-shielding coating including a resin composition containing at least an epoxy resin, a coloring agent including a dye, and titania fine particles having an average primary particle diameter of 1 nm or more and 100 nm or less and including an organic solvent dissolving or dispersing the resin composition. The concentration of the titania fine particles is 20% by mass or more and 60% by mass or less of the resin composition.

9 Claims, No Drawings

LIGHT-SHIELDING COATING, LIGHT-SHIELDING FILM, AND OPTICAL ELEMENT

TECHNICAL FIELD

The present invention relates to a light-shielding coating, a light-shielding film, and an optical element having the light-shielding film. More specifically, the invention relates to a light-shielding coating and light-shielding film that contain at least an epoxy resin, titania fine particles, and a coloring agent.

BACKGROUND ART

An optical element used in optical equipment, for example, in a camera, a binocular telescope, a microscope, or a semiconductor exposure apparatus has been optionally provided with a black light-shielding film at an outside of the optically effective area to reduce stray light. This light-shielding film sufficiently absorbs stray light reached, for example, the edge of a lens to reduce unnecessary light such as flare and ghost.

This light-shielding film is expected to have an effect of reducing stray light entered in the light-shielding film from the inside of the optical element and an effect of reducing stray light entered in the light-shielding film from the air interface. That is, the light-shielding film is required to suitably reduce two types of reflected light called internal reflection and surface reflection.

Recently, along with a reduction in size and an improvement in performance of optical equipment, materials having higher refractive indices have been widely used in optical elements of optical systems. Specifically, for example, a glass material having a refractive index of 1.8 to 2.0 or higher than 2.0 is used. In order to reduce internal reflection of stray light entering into an optical element having a high refractive index, the light-shielding film needs to have a higher refractive index. Accordingly, for example, a material having a high refractive index is added to a light-shielding film to control the refractive index of the light-shielding film to a suitable level (PTLs 1 and 2).

PTL 1 discloses an internal reflection light-absorbing coating that prevents internal reflection by adding coal tar to the coating to increase the refractive index and also adding coal tar, carbon black, and a dye to the coating to absorb light. PTL 2 discloses an internal reflection-preventing coating for an optical member. The coating contains inorganic fine particles having a refractive index of 1.5 or more and a pigment.

CITATION LIST

Patent Literature

PTL 1: Japanese Patent Publication No. 47-32419
PTL 2: Japanese Patent Laid-Open No. 7-82510

SUMMARY OF INVENTION

Technical Problem

In the case of using coal tar as a refractive index adjuster as in PTL 1, unfortunately, the increase in refractive index has a limit. For example, it tends to be difficult to suitably reduce the internal reflectivity of an optical element using a glass material having a high refractive index to a desired level.

In the case of an internal reflection-preventing coating containing fine particles having a higher refractive index and a pigment as in PTL 2, the refractive index is probably sufficiently increased to a desired level. However, this coating is a hetero dispersion system of a pigment and another component and is therefore very difficult to obtain a good dispersion state without forming coarse aggregates of each of the plurality of types of fine particles to reduce internal reflectivity to a suitable range for optical performance.

Furthermore, the light-shielding film is also required to appropriately reduce surface reflection and is required to increase glare prevention ability at the air interface with a suitably roughened surface.

Solution to Problem

The present invention provides a light-shielding film having both a sufficiently low internal reflectivity for practical use and a sufficient glare prevention ability at the air interface for practical use. The present invention also provides a light-shielding coating that can form such a light-shielding film and an optical element having the light-shielding film.

An aspect of the present invention relates to a light-shielding coating including a resin composition containing at least an epoxy resin, a coloring agent including a dye, and titania fine particles having an average primary particle diameter of 1 nm or more and 100 nm or less; and an organic solvent dissolving or dispersing the resin composition, wherein the concentration of the titania fine particles is 20% by mass or more and 60% by mass or less of the resin composition.

In an aspect of the present invention, the organic solvent of the light-shielding coating can be a mixture of a plurality of organic solvents.

In an aspect of the present invention, the organic solvent of the light-shielding coating can contain at least propylene glycol monomethyl ether and propylene glycol monomethyl ether acetate.

In an aspect of the present invention, the epoxy resin of the light-shielding coating can be a bisphenol A-type epoxy resin.

Another aspect of the present invention relates to a light-shielding film comprising at least an epoxy resin, a coloring agent including a dye, titania fine particles having an average primary particle diameter of 1 nm or more and 100 nm or less, and an epoxy resin curing agent, wherein the concentration of the titania fine particles is 20% by mass or more and 60% by mass or less.

In an aspect of the present invention, the epoxy resin of the light-shielding film can be a bisphenol A-type epoxy resin.

Another aspect of the present invention relates to an optical element to be applied to any of a camera, a binocular telescope, a microscope, or a semiconductor exposure apparatus. The optical element includes a light-shielding film according to the aspects described above at the outside of the optically effective surface of the optical element.

Advantageous Effects of Invention

The light-shielding film of the present invention can have both a sufficiently low internal reflectivity for practical use and a sufficient glare prevention ability at the air interface for practical use. Accordingly, the light-shielding film applied to an optical element that is used in optical equipment, such as a camera, a binocular telescope, a microscope, or a semiconductor exposure apparatus, can sufficiently reduce unnecessary light for practical use and can be thus appropriately used.

DESCRIPTION OF EMBODIMENT

The present invention can be achieved by the above-described constitution, specifically, by the following embodiment.

A film sufficiently functioning as a light-shielding film can induce stray light at the interface between the optical element and the light-shielding film to the inside of the light-shielding film as much as possible and can sufficiently absorb the stray light induced therein. In order to achieve this, the light-shielding film is required to have a refractive index near that of a material used in the optical element serving as a substrate. In addition, in order to absorb the stray light induced to the inside of the light-shielding film, the light-shielding film has to contain a component that absorbs light.

The present inventors have diligently studied and, as a result, have found that a light-shielding film containing an epoxy resin is effective when the epoxy resin contains titania fine particles as a component adjusting the refractive index and a coloring agent including a dye as a component absorbing stray light induced to the inside of the film.

Titania Fine Particles

Titania fine particles themselves have a high refractive index. The refractive index of a light-shielding film containing the titania fine particles can therefore be easily adjusted to a desired level. In addition, sufficiently fine titania particles can be commercially available at a relatively low cost. Accordingly, titania fine particles can be suitably used in the light-shielding film. The concentration of the titania fine particles in the light-shielding film of the present invention can be 20% by mass or more and 60% by mass or less, further 20% by mass or more and 55% by mass or less, of the non-volatile components. A concentration of less than 20% by mass cannot sufficiently increase the refractive index of a light-shielding film, and a concentration of higher than 60% by mass cannot provide sufficient film properties as a light-shielding film. The term "non-volatile components" in the present invention refers to the residue after leaving a light-shielding coating at 200 degrees Celsius for 2 hours. Accordingly, the concentration of the titania fine particles in a light-shielding film is almost equal to the concentration of the titania fine particles with respect to the resin composition composed of an epoxy resin, the titania fine particles, a dye, and other components excluding the organic solvent of the light-shielding coating.

The titania fine particles of the present invention can have an average primary particle diameter of 1 nm or more and 100 nm or less, further 1 nm or more and 70 nm or less. An average primary particle diameter of less than 1 nm considerably increases the surface areas of the fine particles to tend to easily cause aggregation of the titania fine particles, resulting in difficulty in stable dispersion. In an average primary particle diameter of higher than 100 nm, a single particle itself becomes a light-scattering source and thereby cannot show a sufficient performance as a light-shielding film. The term "average primary particle diameter" in the present invention refers to the equivalent volume diameter in non-aggregated particles. The average primary particle diameter of the titania fine particles is the number-average particle diameter.

The titania fine particles of the present invention may be produced by any known method such as a gas phase method or a liquid phase method as long as the refractive index and the average primary particle diameter satisfy desired requirements. Examples of the method include a method of synthesizing titania fine particles by burning metal powder thrown in a flame under an atmosphere containing at least oxygen; and a sol-gel method by hydrolysis and polycondensation of titanium alkoxide in the presence of a catalyst. Titania is known to have a rutile structure or an anatase structure, which shows a higher refractive index than that of an amorphous structure. The titania fine particles may have any crystal form that satisfies a desired refractive index.

Light-Shielding Coating

The light-shielding coating of the present invention may be prepared by directly adding titania fine particles in the form of powder to an epoxy resin and subjecting the resulting mixture to dispersion treatment or by adding slurry where titania fine particles are suitably dispersed in a solvent to an epoxy resin. The solvent used in the slurry may be any solvent that can satisfactorily disperse titania fine particles and can dissolve components such as the epoxy resin, a dye, and other necessary components. Examples of the solvent include known low-polar organic solvents such as hydrocarbon solvents and aromatic solvents; and known polar organic solvents such as ether solvents, ester solvents, ketone solvents, and amide solvents. In particular, a known polar solvent such as an ether solvent, an ester solvent, a ketone solvent, or an amide solvent can be used. Furthermore, one or more of propylene glycol monomethyl ether (hereinafter, referred to as PGME) and propylene glycol monomethyl ether acetate (hereinafter, referred to as PGMEA) can be used. The solvent used in the slurry may be removed by, for example, evaporation after addition to an epoxy resin, but may be used as a constitutional component of the light-shielding coating without being removed as far as possible, from the viewpoint of manufacturing cost. In such a case, it is also important to use a solvent that has good coatability to optical elements and can be sufficiently removed by volatilization when a coating film is formed by drying and firing after coating and also can appropriately roughens the air interface.

A method of appropriately roughening the air interface of a light-shielding film coated onto an optical element will be described below. The light-shielding film of the present invention is formed by applying a light-shielding coating containing a resin composition of the present invention to a substrate and then removing the solvent by drying. The volatilization of this solvent causes unevenness in distribution of surface tension, resulting in generation of Marangoni convection. This convection also causes ununiform concentration distributions of the epoxy resin, dye, and titania fine particles in the resin composition and forms a Benard cell structure on the coating film surface. As a result, the coating film has an appropriately roughened air interface instead of a smooth air interface.

Organic Solvent

As described above, the organic solvent of the light-shielding coating of the present invention is not particularly limited as long as the solvent has ability of dispersing the titania fine particles, ability of dissolving the epoxy resin and the dye, and good coatability. Furthermore, the organic solvent may be one that can also be used as a titania slurry solvent and also generates Marangoni convection during drying after coating to form Benard cells and thereby forms an appropriately roughened air interface on the coating film surface after drying.

Specifically, the organic solvent can be a known low-polar organic solvent such as a hydrocarbon solvent or an aromatic solvent or a known polar organic solvent such as an ether solvent, an ester solvent, a ketone solvent, or an amide solvent. In particular, a known polar solvent such as an ether solvent, an ester solvent, a ketone solvent, or an amide solvent can be used. Furthermore, one or more of PGME and PGMEA can be used.

Dispersant

The titania fine particles may have a surface modified with a surface modifier in order to prevent coarse aggregation and to maintain good dispersibility or may be treated with, for example, a dispersant or a surfactant for increasing the dispersibility. The types and the amounts of the surface modifier, dispersant, and surfactant are not particularly limited in the ranges that can maintain desired dispersibility and compatibility with the epoxy resin, the dye, and other components. Examples of the surface modifier, dispersant, and surfactant include silicon, titanium, aluminum, and zirconium alkoxide compounds; chlorides such as chlorosilane; acid-based dispersants such as phosphoric acid and carboxylic acid; and known amine, amide, ester, ketone, ether, glycoxide, alcohol, and acrylic surface modifiers and dispersants. These surface modifiers, dispersants, and surfactants can be used alone or in combination thereof.

The titania fine particles may contain a component such as silica or alumina for reducing the photoactivity within a range that can maintain the desired refractive index and dispersibility.

Epoxy Resin

As the epoxy resin of the present invention, one or more known epoxy resins can be used within a range that does not impair the dispersibility of titania fine particles, compatibility with a dye, hardenability of various hardeners, stability as a coating film, and adhesiveness with a substrate. Specific examples of the epoxy resin include glycidyl ether, glycidyl ester, and glycidyl amine epoxy resins; linear aliphatic epoxides; and alicyclic epoxides. In Particular, one or more glycidyl ether epoxy resins, furthermore, a bisphenol A-type epoxy resin can be used.

Coloring Agent Including Dye

The dye of the present invention is not particularly limited within a range that maintains absorption in the visible region and does not impair compatibility with the epoxy resin and dispersibility of the titania fine particles, and a known dye can be used. A single dye may be used, or a plurality of dyes, such as black, red, yellow, and blue dyes, may be used for adjusting absorption wavelength. Examples of the dye include azo dyes, which have various colors, anthraquinone dyes, phthalocyanine dyes, stilbenzene dyes, pyrazolone dyes, thiazole dyes, carbonium dyes, and azine dyes. In particular, in order to increase light resistance, water resistance, and heat resistance, dyes containing a metal such as chromium, cobalt, or copper can be used.

The content of the dye contained in the light-shielding film of the present invention can be 15% by mass or more and 50% by mass or less, furthermore 15% by mass or more and 40% by mass or less, and particularly 15% by mass or more and 35% by mass or less, of the non-volatile components. The dye of the present invention is used for the purpose of sufficiently absorbing stray light induced to the inside of the light-shielding film and also can control the refractive index or the absorption constant at each wavelength. Accordingly, desired characteristics can be satisfied by controlling the types and the amounts of a plurality of dyes depending on the reflection characteristics of each wavelength.

The light-shielding coating of the present invention may further contain a silane coupling agent. The silane coupling agent generally chemically bonds the hydroxyl groups on a glass surface and the reactive groups in the light-shielding coating and thereby has an effect of enhancing the adhesion. Thus, the silane coupling agent used in the present invention can show high adhesiveness with glass. Specific examples of the silane coupling agent include those having reactive functional groups such as epoxy, amino, vinyl, methacryl, acryl, styryl, ureido, mercapto, sulfide, and isocyanate groups, in particular, silane coupling agents having epoxy groups as the reactive functional groups, more specifically, 2-(3,4-epoxycyclohexyl)ethyltrimethoxysilane, 3-glycidoxypropyltriethoxysilane, 3-glycidoxypropyltrimethoxysilane, 3-glycidoxypropylmethyldiethoxysilane, and 3-glycidoxypropylmethyldimethoxysilane.

The content of the silane coupling agent can be 20% by mass or less, furthermore 10% by mass or less, and particularly 2.5% by mass or more and 5.5% by mass or less, of the non-volatile components. A content of the silane coupling agent exceeding 5.5% by mass may cause white spot appearance on the interface between the substrate and the light-shielding film. Though the silane coupling agent of the present invention is used for enhancing the adhesiveness of the light-shielding film with the substrate, the silane coupling agent can also inhibit cracking of the thick light-shielding film under high temperature and high humidity. Accordingly, desired film characteristics can be satisfied by adjusting the type and the amount of the silane coupling agent.

The light-shielding coating of the present invention may further contain an additive within a range that does not impair the effects of the present invention. Examples of the additive include plasticizers, coupling agents, flame retardants such as phosphate esters and melamines, surfactants such as fatty acid esters, antistatic agents such as alkyl sulfonates and glycerin esters of stearic acid, antioxidants, fungicides, and antiseptics. These additives may be used alone or in combination thereof.

The resin composition of the present invention can be prepared through mixing, dispersing, and dissolving by a known method. Alternatively, more simply, all constitutional materials may be placed in a container and mixed, dispersed, and dissolved by stirring with, for example, a propeller mixer. Furthermore, the resin composition can be prepared by mixing, dispersing, and dissolving with a known disperser such as an ultrasonic agitator, a mixer, a homogenizer, a planetary rotator, a collision disperser, a disk mill, a sand mill, a bead mill, or a ball mill.

Light-Shielding Film

The light-shielding film of the present invention can be formed by adding an epoxy resin hardener, a hardening accelerator, and other additives to the resin composition of the present invention, uniformly dissolving them therein to obtain a light-shielding coating containing an epoxy resin composition, applying the light-shielding coating to an optical element as a substrate, and drying and firing the coating.

The epoxy resin hardener is not particularly limited, and any known hardener and hardening accelerator that satisfy desired characteristics can be used. Examples of the epoxy resin hardener include polyaddition-type and catalyst-type hardeners or hardening accelerators such as aliphatic polyamines, alicyclic polyamines, aromatic polyamines, acid anhydrides, phenol novolacs, polymercaptans, aliphatic tertiary amines, aromatic tertiary amines, imidazole compounds, and Lewis acid complexes. These hardeners and hardening accelerators can be used alone or in combination thereof. In particular, an aliphatic polyamine, an alicyclic polyamine, an aromatic polyamine, an acid anhydride, a polymercaptan, an aliphatic tertiary amine, an aromatic tertiary amine, or an imidazole compound can be used.

Optical Element

The optical element of the present invention can be used as an element constituting optical equipment such as a lens, a prism, a reflector, or a diffraction grating. For example, the optical element is used in any of a camera, a binocular telescope, a microscope, and a semiconductor exposure apparatus as an optical element having a light-shielding film at the outside of the optically effective surface.

The light-shielding film can be applied to the outside of the optionally effective surface of the optical element serving as a substrate by a known method such as dipping, spin coating, slit coating, electrostatic coating, or application using a coating tool such as brush, a sponge, or a bar coater, according to the desired shape of the light-shielding film.

Conditions for drying and firing subsequent to application can be appropriately selected in the range of satisfying desired characteristics, depending on the type and amount of the hardener to be used. For example, the drying and firing treatment is performed at room temperature to 300 degree Celsius or less, furthermore, at 40 degrees Celsius or more and 250 degrees Celsius or less, in particular, at 40 degrees Celsius or more and 200 degrees Celsius or less for 10 min or more and 10 hours or less, furthermore, for 30 min or more and 10 hours or less, in particular, for 1 hour or more and 10 hours or less.

Examples

The present invention will now be more specifically described by examples and comparative examples, but is not limited to these examples. In the examples of the present invention and comparative examples, internal reflectivity, surface reflectivity, and film cracking under high temperature and high humidity were evaluated as follows.

Evaluation of Internal Reflectivity

The internal reflectivity of light-shielding films was evaluated by the following method.

Evaluation of internal reflectivity was performed with a spectrophotometer, U-4000 (trade name, manufactured by Hitachi High-Technologies Corp.), using a right-angled triangular prism of a glass material, S-LAH53 (trade name, manufactured by Ohara Inc.), provided roughening treatment only at the bottom surface, as a substrate for evaluation samples.

A right-angled triangular prism not provided with the light-shielding film at the bottom was set in such a manner that the measurement light enters the prism so as to be parallel to the bottom through the side surface, and reflectivity (R1) was measured. Subsequently, a light-shielding film was applied to the same prism, and reflectivity (R2) was measured by the same method as above. A value obtained by dividing the reflectivity (R2) by the reflectivity (R1) was used as internal reflectivity.

Evaluation of Surface Reflectivity

The surface reflectivity of light-shielding films was evaluated by the following method.

Evaluation of surface reflectivity was performed with a spectrophotometer, U-4000 (trade name, manufactured by Hitachi High-Technologies Corp.), using flat glass of a glass material, S-BSL7 (trade name, manufactured by Ohara Inc.), provided with mirror-surface treatment and having a light-shielding film on one surface, as a substrate for evaluation samples. The resulting reflectivity was used as surface reflectivity.

Evaluation of Film Cracking Under High Temperature and High Humidity

The cracking of light-shielding films was evaluated by the following method.

A light-shielding film was formed on one surface of flat glass of a glass material, S-LAH58 (trade name, manufactured by Ohara Inc.), provided with mirror-surface treatment as a substrate for evaluation samples so as to have a thickness of 9 micrometers after firing, followed by drying at room temperature for 1 hour and then firing at 200 degrees Celsius for 2 hours. Subsequently, the flat glass provided with the light-shielding film was exposed to an atmosphere of a temperature of 85 degrees Celsius and a humidity of 95% for 6 hours. The interface of the glass and the light-shielding film was observed visually and under a microscope for film cracking. In film cracking evaluation shown in Table 1, A denotes that no cracking was observed, B denotes that no cracking was observed by visual observation, C denotes that minute cracking that does not adversely affect the appearance of the interface between the glass and the light-shielding film was observed by visual observation, and D denotes that cracking that considerably deteriorates the appearance of the interface between the glass and the light-shielding film was visually observed.

Example 1

In a stirring container, 12 g of an epoxy resin jER828 (trade name, manufactured by Mitsubishi Chemical Corp.), 12 g of an epoxy resin EPICLON-EXA-4850-150 (trade name, manufactured by DIC Corp.), 52 g of titania dispersion ND139 (trade name, manufactured by Tayca Corp., a PGME dispersion of 25% by mass of titania, average primary particle diameter: 15 nm), 2.23 g of a dye VALI-FAST-BLACK 3810 (trade name, manufactured by Orient Chemical Industries Co., Ltd.), 5.58 g of a dye VALIFAST-RED 3320 (trade name, manufactured by Orient Chemical Industries Co., Ltd.), 2.23 g of a dye VALIFAST-YELLOW 3108 (trade name, manufactured by Orient Chemical Industries Co., Ltd.), 7.81 g of a dye VALIFAST-BLUE 2620 (trade name, manufactured by Orient Chemical Industries Co., Ltd.), and 1.8 g of a fungicide Syntol M-100 (trade name, manufactured by Sumika Enviro-Science Co., Ltd) were placed, followed by stirring with a planetary rotator HM-500 (trade name, manufactured by Keyence Corp.) for 20 min. The concentration of the titania fine particles in the epoxy resin composition on this occasion was 22.9% by mass. To 28 g of the resulting epoxy resin composition, 2.35 g of an epoxy resin hardener EH-6019 (trade name, manufactured by Adeka Corp.), 0.3 g of a hardening accelerator DMP-30 (trade name, manufactured by Nisshin EM Corp.), and 7.7 g of PGMEA (manufactured by Kishida Chemical Co., Ltd.) were added, followed by stirring with a planetary rotator HM-500 (trade name, manufactured by Keyence Corp.) for 20 min.

The resulting light-shielding coating was applied onto the rough surface of the right-angled triangular prism or the flat glass with a spin coater in such a manner that the thickness after firing would be 3 micrometers or 9 micrometers, followed by drying at room temperature for 1 hour and then firing at 200 degrees Celsius for 2 hours in a thermostatic oven. Table 1 shows the evaluation results of internal reflectivity, surface reflectivity, and film cracking under high temperature and high humidity of the resulting light-shielding films.

Example 2

An epoxy resin composition and its light-shielding coating were prepared as in EXAMPLE 1 except that the amounts of components placed in a stirring container were changed to 10.5 g of the epoxy resin jER828 (trade name, manufactured by Mitsubishi Chemical Corp.), 10.5 g of the epoxy resin EPICLON-EXA-4850-150 (trade name, manufactured by DIC Corp.), 68 g of the titania dispersion ND139 (trade name, manufactured by Tayca Corp., a PGME dispersion of 25% by mass of titania, average primary particle diameter: 15 nm), 1.8 g of the epoxy resin hardener EH-6019 (trade name, manufactured by Adeka Corp.), and 8.8 g of the PGMEA (manufactured by Kishida Chemical Co., Ltd.). Light-shielding films were formed using this light-shielding coating as in EXAMPLE 1. The concentration of the titania fine particles in the epoxy resin composition on this occasion was 29.5% by mass. Table 1 shows the evaluation results of internal reflectivity, surface reflectivity, and film cracking under high temperature and high humidity of the resulting light-shielding films.

Example 3

In a stirring container, 4 g of an epoxy resin EPICLON-EXA-4850-150 (trade name, manufactured by DIC Corp.), 40 g of titania dispersion ND139 (trade name, manufactured by Tayca Corp., a PGME dispersion of 25% by mass of titania, average primary particle diameter: 15 nm), 1.24 g of a dye VALIFAST-BLACK 3810 (trade name, manufactured by Orient Chemical Industries Co., Ltd.), 3.1 g of a dye VALIFAST-RED 3320 (trade name, manufactured by Orient Chemical Industries Co., Ltd.), 1.24 g of a dye VALIFAST-YELLOW 3108 (trade name, manufactured by Orient Chemical Industries Co., Ltd.), 3.72 g of a dye VALIFAST-BLUE 2620 (trade name, manufactured by Orient Chemical Industries Co., Ltd.), 0.9 g of a fungicide Syntol M-100 (trade name, manufactured by Sumika Enviro-Science Co., Ltd), 24 g of PGME (manufactured by Kishida Chemical Co., Ltd.), 2.4 g of a coupling agent KBM-403 (trade name, manufactured by Shin-Etsu Chemical Co., Ltd.), and 4 g of a plasticizer Nikanol Y50 (trade name, manufactured by Fudow Co., Ltd.) were placed, followed by stirring with a planetary rotator HM-500 (trade name, manufactured by Keyence Corp.) for 20 min. The concentration of the titania fine particles in the epoxy resin composition on this occasion was 41.3% by mass. To 8 g of the resulting epoxy resin composition, 0.11 g of an epoxy resin hardener Adeka hardener EH551CH (trade name, manufactured by Adeka Corp.) and 4 g of PGMEA (manufactured by Kishida Chemical Co., Ltd.) were added, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Example 4

In a stirring container, 3 g of an epoxy resin EPICLON-EXA-4850-150 (trade name, manufactured by DIC Corp.), 56 g of titania dispersion ND139 (trade name, manufactured by Tayca Corp., a PGME dispersion of 25% by mass of titania, average primary particle diameter: 15 nm), 0.99 g of a dye VALIFAST-BLACK 3810 (trade name, manufactured by Orient Chemical Industries Co., Ltd.), 2.48 g of a dye VALIFAST-RED 3320 (trade name, manufactured by Orient Chemical Industries Co., Ltd.), 0.99 g of a dye VALIFAST-YELLOW 3108 (trade name, manufactured by Orient Chemical Industries Co., Ltd.), 2.98 g of a dye VALIFAST-BLUE 2620 (trade name, manufactured by Orient Chemical Industries Co., Ltd.), and 0.8 g of a fungicide Syntol M-100 (trade name, manufactured by Sumika Enviro-Science Co., Ltd) were placed, followed by stirring with a planetary rotator HM-500 (trade name, manufactured by Keyence Corp.) for 20 min. The concentration of the titania fine particles in the epoxy resin composition on this occasion was 55.5% by mass. To 7 g of the resulting epoxy resin composition, 0.09 g of an epoxy resin hardener Adeka hardener EH551CH (trade name, manufactured by Adeka Corp.) and 3 g of PGMEA (manufactured by Kishida Chemical Co., Ltd.) were added, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Example 5

An epoxy resin composition was prepared as in EXAMPLE 1 except that the amounts of components placed in a stirring container were changed to 4.16 g of the epoxy resin jER828 (trade name, manufactured by Mitsubishi Chemical Corp.), 16.64 g of the epoxy resin EPICLON-EXA-4850-150 (trade name, manufactured by DIC Corp.), and 80 g of the titania dispersion ND139 (trade name, manufactured by Tayca Corp., a PGME dispersion of 25% by mass of titania, average primary particle diameter: 15 nm). The concentration of the titania fine particles in the epoxy resin composition on this occasion was 33.1% by mass. To 14 g of the resulting epoxy resin composition, 0.87 g of an epoxy resin hardener Adeka hardener EH551CH (trade name, manufactured by Adeka Corp.) and 4.7 g of PGMEA (manufactured by Kishida Chemical Co., Ltd.) were added, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Example 6

In a ball mill pot, 104 g of an epoxy resin jER828 (trade name, manufactured by Mitsubishi Chemical Corp.), 416 g of an epoxy resin EPICLON-EXA-4850-150 (trade name, manufactured by DIC Corp.), 2000 g of titania dispersion ND139 (trade name, manufactured by Tayca Corp., a PGME dispersion of 25% by mass of titania, average primary particle diameter: 15 nm), 56 g of a dye VALIFAST-BLACK 3810 (trade name, manufactured by Orient Chemical Industries Co., Ltd.), 140 g of a dye VALIFAST-RED 3320 (trade name, manufactured by Orient Chemical Industries Co., Ltd.), 56 g of a dye VALIFAST-YELLOW 3108 (trade name, manufactured by Orient Chemical Industries Co., Ltd.), 195 g of a dye VALIFAST-BLUE 2620 (trade name, manufactured by Orient Chemical Industries Co., Ltd.), 45 g of a fungicide Syntol M-100 (trade name, manufactured by Sumika Enviro-Science Co., Ltd), 25 magnetic balls having a diameter of 30 mm, and 25 magnetic balls having a diameter of 35 mm were placed. The ball mill pot was rotated with a rotator at 50 rpm for 24 hours. The concentration of the titania fine particles in the epoxy resin composition on this occasion was 33.1% by mass. To 14 g of the resulting epoxy resin composition, 0.87 g of an epoxy resin Adeka hardener EH551CH (trade name, manufactured by Adeka Corp.) and 4.7 g of PGMEA (manufactured by Kishida Chemical Co., Ltd.) were added, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Example 7

In a ball mill pot, 104 g of an epoxy resin jER828 (trade name, manufactured by Mitsubishi Chemical Corp.), 416 g of an epoxy resin EPICLON-EXA-4850-150 (trade name, manufactured by DIC Corp.), 2000 g of titania dispersion ND139 (trade name, manufactured by Tayca Corp., a PGME dispersion of 25% by mass of titania, average primary particle diameter: 15 nm), 56 g of a dye VALIFAST-BLACK 3810 (trade name, manufactured by Orient Chemical Industries Co., Ltd.), 140 g of a dye VALIFAST-RED 3320 (trade name, manufactured by Orient Chemical Industries Co., Ltd.), 56 g of a dye VALIFAST-YELLOW 3108 (trade name, manufactured by Orient Chemical Industries Co., Ltd.), 195 g of a dye VALIFAST-BLUE 2620 (trade name, manufactured by Orient Chemical Industries Co., Ltd.), 45 g of a fungicide Syntol M-100 (trade name, manufactured by Sumika Enviro-Science Co., Ltd), 25 magnetic balls having a diameter of 30 mm, and 25 magnetic balls having a diameter of 35 mm were placed. The ball mill pot was rotated with a rotator at 50 rpm for 70 hours. To 14 g of the resulting epoxy resin composition, 0.32 g of an epoxy silane coupling agent KBM-303 (trade name, manufactured by Shin-Etsu Chemical Co., Ltd.) was added. The concentration of the titania fine particles in the epoxy resin composition on this occasion was 31.6% by mass. Subsequently, 0.87 g of an epoxy resin Adeka hardener EH551CH (trade name, manufactured by Adeka Corp.) and 4.0 g of PGMEA (manufactured by Kishida Chemical Co., Ltd.) were added to the epoxy resin composition, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Example 8

In a ball mill pot, 104 g of an epoxy resin jER828 (trade name, manufactured by Mitsubishi Chemical Corp.), 416 g of an epoxy resin EPICLON-EXA-4850-150 (trade name, manufactured by DIC Corp.), 2000 g of titania dispersion ND139 (trade name, manufactured by Tayca Corp., a PGME dispersion of 25% by mass of titania, average primary particle diameter: 15 nm), 56 g of a dye VALIFAST-BLACK 3810 (trade name, manufactured by Orient Chemical Industries Co., Ltd.), 140 g of a dye VALIFAST-RED 3320 (trade name, manufactured by Orient Chemical Industries Co., Ltd.), 56 g of a dye VALIFAST-YELLOW 3108 (trade name, manufactured by Orient Chemical Industries Co., Ltd.), 195 g of a dye VALIFAST-BLUE 2620 (trade name, manufactured by Orient Chemical Industries Co., Ltd.), 45 g of a fungicide Syntol M-100 (trade name, manufactured by Sumika Enviro-Science Co., Ltd), 25 magnetic balls having a diameter of 30 mm, and 25 magnetic balls having a diameter of 35 mm were placed. The ball mill pot was rotated with a rotator at 50 rpm for 70 hours. To 14 g of the resulting epoxy resin composition, 0.32 g of an epoxy silane coupling agent KBE-402 (trade name, manufactured by Shin-Etsu Chemical Co., Ltd.) was added. The concentration of the titania fine particles in the epoxy resin composition on this occasion was 31.6% by mass. Subsequently, 0.87 g of an epoxy resin Adeka hardener EH551CH (trade name, manufactured by Adeka Corp.) and 4.0 g of PGMEA (manufactured by Kishida Chemical Co., Ltd.) were added to the epoxy resin composition, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Example 9

In a ball mill pot, 104 g of an epoxy resin jER828 (trade name, manufactured by Mitsubishi Chemical Corp.), 416 g of an epoxy resin EPICLON-EXA-4850-150 (trade name, manufactured by DIC Corp.), 2000 g of titania dispersion ND139 (trade name, manufactured by Tayca Corp., a PGME dispersion of 25% by mass of titania, average primary particle diameter: 15 nm), 56 g of a dye VALIFAST-BLACK 3810 (trade name, manufactured by Orient Chemical Industries Co., Ltd.), 140 g of a dye VALIFAST-RED 3320 (trade name, manufactured by Orient Chemical Industries Co., Ltd.), 56 g of a dye VALIFAST-YELLOW 3108 (trade name, manufactured by Orient Chemical Industries Co., Ltd.), 195 g of a dye VALIFAST-BLUE 2620 (trade name, manufactured by Orient Chemical Industries Co., Ltd.), 45 g of a fungicide Syntol M-100 (trade name, manufactured by Sumika Enviro-Science Co., Ltd), 25 magnetic balls having a diameter of 30 mm, and 25 magnetic balls having a diameter of 35 mm were placed. The ball mill pot was rotated with a rotator at 50 rpm for 70 hours. To 14 g of the resulting epoxy resin composition, 0.32 g of an epoxy silane coupling agent KBE-403 (trade name, manufactured by Shin-Etsu Chemical Co., Ltd.) was added. The concentration of the titania fine particles in the epoxy resin composition on this occasion was 31.6% by mass. Subsequently, 0.87 g of an epoxy resin Adeka hardener EH551CH (trade name, manufactured by Adeka Corp.) and 4.0 g of PGMEA (manufactured by Kishida Chemical Co., Ltd.) were added to the epoxy resin composition, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Example 10

In a ball mill pot, 104 g of an epoxy resin jER828 (trade name, manufactured by Mitsubishi Chemical Corp.), 416 g of an epoxy resin EPICLON-EXA-4850-150 (trade name, manufactured by DIC Corp.), 2000 g of titania dispersion ND139 (trade name, manufactured by Tayca Corp., a PGME dispersion of 25% by mass of titania, average primary particle diameter: 15 nm), 56 g of a dye VALIFAST-BLACK 3810 (trade name, manufactured by Orient Chemical Industries Co., Ltd.), 140 g of a dye VALIFAST-RED 3320 (trade name, manufactured by Orient Chemical Industries Co., Ltd.), 56 g of a dye VALIFAST-YELLOW 3108 (trade name, manufactured by Orient Chemical Industries Co., Ltd.), 195 g of a dye VALIFAST-BLUE 2620 (trade name, manufactured by Orient Chemical Industries Co., Ltd.), 45 g of a fungicide Syntol M-100 (trade name, manufactured by Sumika Enviro-Science Co., Ltd), 25 magnetic balls having a diameter of 30 mm, and 25 magnetic balls having a diameter of 35 mm were placed. The ball mill pot was rotated with a rotator at 50 rpm for 70 hours. To 14 g of the resulting epoxy resin composition, 0.32 g of an epoxy silane coupling agent KBM-403 (trade name, manufactured by Shin-Etsu Chemical Co., Ltd.) was added. The concentration of the titania fine particles in the epoxy resin composition on this occasion was 31.6% by mass. Subsequently, 0.87 g of an epoxy resin Adeka hardener EH551CH (trade name, manufactured by Adeka Corp.) and 4.0 g of PGMEA (manufactured by Kishida Chemical Co., Ltd.) were added to the epoxy resin composition, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Example 11

In a ball mill pot, 104 g of an epoxy resin jER828 (trade name, manufactured by Mitsubishi Chemical Corp.), 416 g of an epoxy resin EPICLON-EXA-4850-150 (trade name, manufactured by DIC Corp.), 2000 g of titania dispersion ND139 (trade name, manufactured by Tayca Corp., a PGME dispersion of 25% by mass of titania, average primary particle diameter: 15 nm), 56 g of a dye VALIFAST-BLACK 3810 (trade name, manufactured by Orient Chemical Industries Co., Ltd.), 140 g of a dye VALIFAST-RED 3320 (trade name, manufactured by Orient Chemical Industries Co., Ltd.), 56 g of a dye VALIFAST-YELLOW 3108 (trade name, manufactured by Orient Chemical Industries Co., Ltd.), 195 g of a dye VALIFAST-BLUE 2620 (trade name, manufactured by Orient Chemical Industries Co., Ltd.), 45 g of a fungicide Syntol M-100 (trade name, manufactured by Sumika Enviro-Science Co., Ltd), 25 magnetic balls having a diameter of 30 mm, and 25 magnetic balls having a diameter of 35 mm were placed. The ball mill pot was rotated with a rotator at 50 rpm for 70 hours. To 14 g of the resulting epoxy resin composition, 0.20 g of an epoxy silane coupling agent KBM-403 (trade name, manufactured by Shin-Etsu Chemical Co., Ltd.) was added. The concentration of the titania fine particles in the epoxy resin composition on this occasion was 32.2% by mass. Subsequently, 0.87 g of an epoxy resin Adeka hardener EH551CH (trade name, manufactured by Adeka Corp.) and 4.0 g of PGMEA (manufactured by Kishida Chemical Co., Ltd.) were added to the epoxy resin composition, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Example 12

In a ball mill pot, 104 g of an epoxy resin jER828 (trade name, manufactured by Mitsubishi Chemical Corp.), 416 g of an epoxy resin EPICLON-EXA-4850-150 (trade name, manufactured by DIC Corp.), 2000 g of titania dispersion ND139 (trade name, manufactured by Tayca Corp., a PGME dispersion of 25% by mass of titania, average primary particle diameter: 15 nm), 56 g of a dye VALIFAST-BLACK 3810 (trade name, manufactured by Orient Chemical Industries Co., Ltd.), 140 g of a dye VALIFAST-RED 3320 (trade name, manufactured by Orient Chemical Industries Co., Ltd.), 56 g of a dye VALIFAST-YELLOW 3108 (trade name, manufactured by Orient Chemical Industries Co., Ltd.), 195 g of a dye VALIFAST-BLUE 2620 (trade name, manufactured by Orient Chemical Industries Co., Ltd.), 45 g of a fungicide Syntol M-100 (trade name, manufactured by Sumika Enviro-Science Co., Ltd), 25 magnetic balls having a diameter of 30 mm, and 25 magnetic balls having a diameter of 35 mm were placed. The ball mill pot was rotated with a rotator at 50 rpm for 70 hours. To 14 g of the resulting epoxy resin composition, 0.40 g of an epoxy silane coupling agent KBM-403 (trade name, manufactured by Shin-Etsu Chemical Co., Ltd.) was added. The concentration of the titania fine particles in the epoxy resin composition on this occasion was 31.3% by mass. Subsequently, 0.87 g of an epoxy resin Adeka hardener EH551CH (trade name, manufactured by Adeka Corp.) and 4.0 g of PGMEA (manufactured by Kishida Chemical Co., Ltd.) were added to the epoxy resin composition, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Comparative Example 1

In a stirring container, 8 g of an epoxy resin EPICLON-EXA-4850-150 (trade name, manufactured by DIC Corp.), 1.24 g of a dye VALIFAST-BLACK 3810 (trade name, manufactured by Orient Chemical Industries Co., Ltd.), 3.1 g of a dye VALIFAST-RED 3320 (trade name, manufactured by Orient Chemical Industries Co., Ltd.), 1.24 g of a dye VALIFAST-YELLOW 3108 (trade name, manufactured by Orient Chemical Industries Co., Ltd.), 3.72 g of a dye VALIFAST-BLUE 2620 (trade name, manufactured by Orient Chemical Industries Co., Ltd.), 0.9 g of a fungicide Syntol M-100 (trade name, manufactured by Sumika Enviro-Science Co., Ltd), 54 g of PGME (manufactured by Kishida Chemical Co., Ltd.), and 2.4 g of a coupling agent KBM-403 (trade name, manufactured by Shin-Etsu Chemical Co., Ltd.) were placed, followed by stirring with a planetary rotator HM-500 (trade name, manufactured by Keyence Corp.) for 20 min. The concentration of the titania fine particles in the epoxy resin composition on this occasion was 0% by mass. To 8 g of the resulting epoxy resin composition, 0.24 g of an epoxy resin Adeka hardener EH551CH (trade name, manufactured by Adeka Corp.) and 4 g of PGMEA (manufactured by Kishida Chemical Co., Ltd.) were added, followed by stirring with a planetary rotator HM-500 (trade name, manufactured by Keyence Corp.) for 20 min.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

Comparative Example 2

In a stirring container, 1.5 g of an epoxy resin EPICLON-EXA-4850-150 (trade name, manufactured by DIC Corp.), 80 g of titania dispersion ND139 (trade name, manufactured by Tayca Corp., a PGME dispersion of 25% by mass of titania, average primary particle diameter: 15 nm), 1.12 g of a dye VALIFAST-BLACK 3810 (trade name, manufactured by Orient Chemical Industries Co., Ltd.), 2.79 g of a dye VALIFAST-RED 3320 (trade name, manufactured by Orient Chemical Industries Co., Ltd.), 1.12 g of a dye VALIFAST-YELLOW 3108 (trade name, manufactured by Orient Chemical Industries Co., Ltd.), 3.91 g of a dye VALIFAST-BLUE 2620 (trade name, manufactured by Orient Chemical Industries Co., Ltd.), and 0.8 g of a fungicide Syntol M-100 (trade name, manufactured by Sumika Enviro-Science Co., Ltd) were placed, followed by stirring with a planetary rotator HM-500 (trade name, manufactured by Keyence Corp.) for 20 min. The concentration of the titania fine particles in the epoxy resin composition on this occasion was 64.0% by mass. To 14 g of the resulting epoxy resin composition, 0.07 g of an epoxy resin Adeka hardener EH551CH (trade name, manufactured by Adeka Corp.) and 6.2 g of PGMEA (manufactured by Kishida Chemical Co., Ltd.) were added, followed by stirring with a planetary rotator HM-500 (trade name, manufactured by Keyence Corp.) for 20 min.

Light-shielding films were formed using this light-shielding coating as in EXAMPLE 1, but the films were fragile and could not be used as light-shielding films.

Comparative Example 3

An epoxy resin composition was prepared as in EXAMPLE 2. To 28 g of this epoxy resin composition, 1.8 g of an epoxy resin Adeka hardener EH-6019 (trade name, manufactured by Adeka Corp.) and 0.3 g of a hardening accelerator DMP-30 (trade name, manufactured by Nisshin EM Corp.) were added, followed by stirring with a planetary rotator HM-500 (trade name, manufactured by Keyence Corp.) for 20 min. The concentration of the titania fine particles in the epoxy resin composition on this occasion was 29.5% by mass.

Light-shielding films were formed using this light-shielding coating as in EXAMPLE 1. Table 1 shows the evaluation results of internal reflectivity, surface reflectivity, and film cracking under high temperature and high humidity of the resulting light-shielding films.

TABLE 1

|  | Internal reflectivity (%) | Surface reflectivity (%) | Film cracking evaluation |
|---|---|---|---|
| EXAMPLE 1 | 0.09 | 4.7 | B |
| EXAMPLE 2 | 0.07 | 4.1 | C |
| EXAMPLE 3 | 0.04 | 4.7 | A |
| EXAMPLE 4 | 0.03 | 4.5 | C |
| EXAMPLE 5 | 0.05 | 3.8 | C |
| EXAMPLE 6 | 0.05 | 4.0 | C |
| EXAMPLE 7 | 0.06 | 4.0 | A |
| EXAMPLE 8 | 0.05 | 4.0 | A |
| EXAMPLE 9 | 0.05 | 4.0 | A |
| EXAMPLE 10 | 0.06 | 4.0 | A |
| EXAMPLE 11 | 0.05 | 4.0 | A |
| EXAMPLE 12 | 0.07 | 4.0 | A |
| COMPARATIVE EXAMPLE 1 | 0.15 | 4.0 | B |
| COMPARATIVE EXAMPLE 3 | 0.06 | 11.2 | C |

The results of all EXAMPLES and COMPARATIVE EXAMPLE 3 show that when the concentration of the titania fine particles in the epoxy resin composition of the present invention is 20% by mass or more and 60% by mass or less, a light-shielding film having sufficient film properties showing a sufficiently low internal reflectivity for practical use and an optical element having such a light-shielding film can be obtained. The results of all EXAMPLES and COMPARATIVE EXAMPLE 1 show that when the light-shielding coating containing the resin composition of the present invention includes a plurality of solvents, the surface reflectivity of the light-shielding film formed by the light-shielding coating is further reduced, which can provide a light-shielding film having sufficient film properties showing a sufficiently low internal reflectivity for practical use and a sufficiently low surface reflectivity for practical use and an optical element having such a light-shielding film. The results of all EXAMPLES and COMPARATIVE EXAMPLES 1 and 3 show that no film cracking that adversely affects the appearance of the interface between the glass and the light-shielding film is observed under high temperature and high humidity, which can provide a light-shielding film having sufficient film properties showing high environmental durability and an optical element having such a light-shielding film. In addition, the results of EXAMPLES 7 to 12 show that light-shielding films having particularly excellent in appearance can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-175898, filed Aug. 11, 2011, which is hereby incorporated by reference herein in its entirety.

The invention claimed is:

1. A light-shielding coating comprising:
 a resin composition containing at least an epoxy resin, a coloring agent including a dye, and titania fine particles having an average primary particle diameter of 1 nm or more and 100 nm or less; and
 an organic solvent dissolving or dispersing the resin composition,
 wherein the concentration of the titania fine particles is 20% by mass or more and 60% by mass or less of the resin composition, and wherein the organic solvent contains at least propylene glycol monomethyl ether and propylene glycol monomethyl ether acetate.

2. The light-shielding coating according to claim 1, wherein the epoxy resin is a bisphenol A-type epoxy resin.

3. The light-shielding coating according to claim 1, wherein the resin composition further contains a silane coupling agent having an epoxy group as a reactive functional group in an amount range of 2.5% by mass or more and 5.5% by mass or less.

4. A light-shielding film at least comprising:
an epoxy resin;
a coloring agent including a dye;
titania fine particles having an average primary particle diameter of 1 nm or more and 100 nm or less; and
an epoxy resin curing agent,
wherein the concentration of the titania fine particles is 20% by mass or more and 60% by mass or less, and
wherein the light-shielding film is formed by drying a light-shielding coating containing propylene glycol monomethyl ether and propylene glycol monomethyl ether acetate.

5. The light-shielding film according to claim 4, wherein the epoxy resin is a bisphenol A-type epoxy resin.

6. An optical element to be applied to any of a camera, a binocular telescope, a microscope, or a semiconductor exposure apparatus, the optical element comprising:
a light-shielding film according to claim 4 at the outside of the optically effective surface of the optical element.

7. The light-shielding film according to claim 4, wherein an internal reflectivity of the light-shielding film is 0.03% or more and 0.09% or less.

8. The light-shielding film according to claim 4, wherein a surface reflectivity of the light-shielding film is 3.8% or more and 4.7% or less.

9. The light-shielding film according to claim 4, wherein an internal reflectivity of the light shielding film is 0.03% or more and 0.09% or less, and
wherein a surface reflectivity of the light-shielding film is 3.8% or more and 4.7% or less.

* * * * *